March 24, 1953   J. A. MacKENZIE   2,632,533
CONSTRUCTIONAL ELEMENT
Filed Nov. 3, 1950
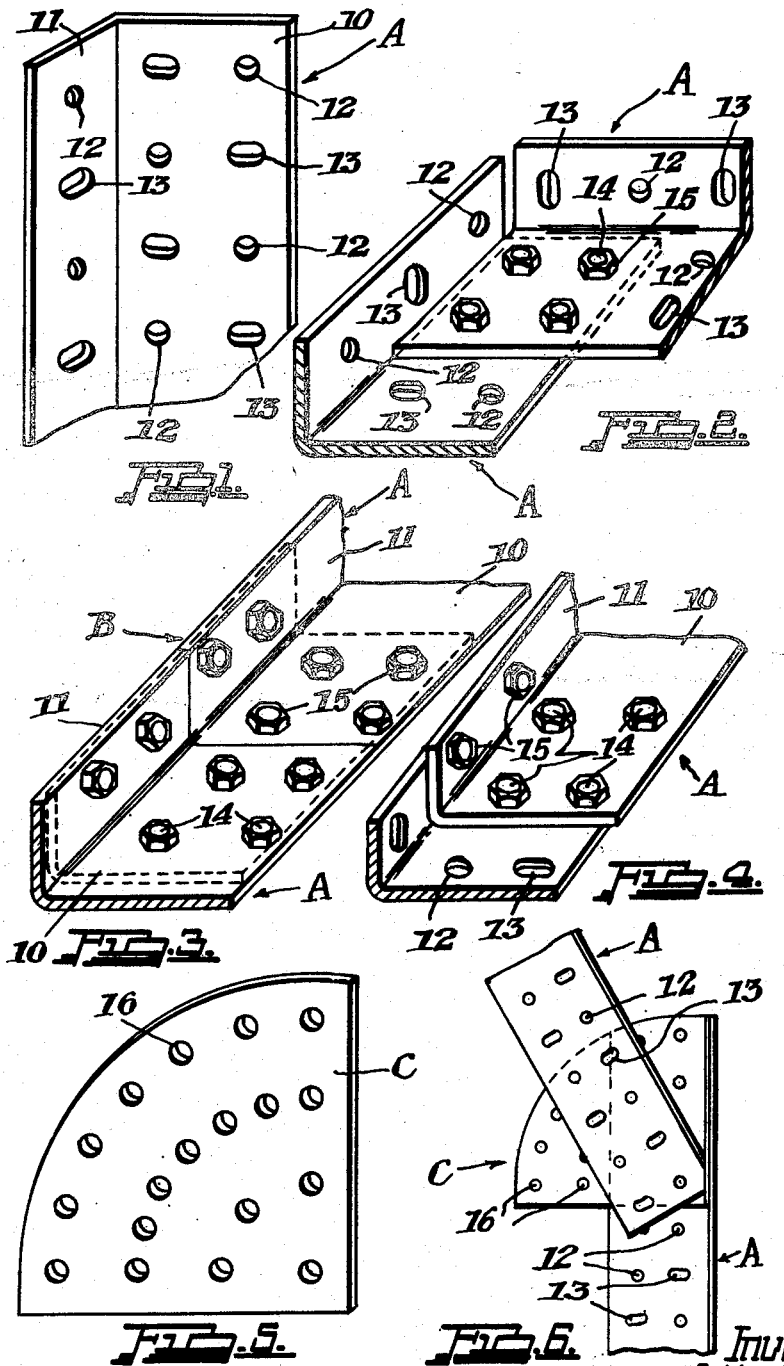
Inventor
James A. MacKenzie
BY Smart & Biggar
Attys Patented Mar. 24, 1953

2,632,533

UNITED STATES PATENT OFFICE 2,632,533

CONSTRUCTIONAL ELEMENT

James Alexander MacKenzie, Eastview, Ontario, Canada

Application November 3, 1950, Serial No. 193,835
In Canada May 8, 1950

1 Claim. (Cl. 189—34)

This invention relates generally to constructional elements, and more particularly to constructional elements of L-shaped cross-section having lines of regularly spaced slots or holes provided in the flanges of the section. Elements of this nature, cut to appropriate lengths, may be bolted together by taking advantage of the slots or holes, to form a variety of frames and structures.

Constructional elements of this type are disclosed in Canadian Patent No. 455,256 which issued to Demetrius Comino on March 22, 1949. While the Comino element is extremely useful it possesses certain disadvantages, which I have overcome by way of the invention about to be described. One of the disadvantages associated with the constructional element of Canadian Patent No. 455,256 is that, if two of the elements described therein are placed in a nesting relationship, in which the corresponding flanges of each member of the pair of elements abut one another (in the forming of an L-shaped beam of double thickness) then the bolt-receiving orifices are transversely misaligned by a distance equal to the thickness of one nested flange. The two elements can only be coupled in this nested relationship by means of bolts which are narrower than the slots by at least an amount equal to the thickness of one nested flange. This gives an inefficient coupling, since the small diameter bolts are apt to shear or to assume angles with respect to the flanges which are at considerable variance with the desirable, i. e. right-angular, relationship.

A further disadvantage associated with the elements of Canadian Patent No. 455,256 is that they cannot be directly spliced to one another to form a substantially continuous L-beam, unless once again bolts are employed which are of the small diameter described above. Moreover, this situation cannot be cured by abutting the two elements end to end and using a short third element section as a splicing plate, unless the third element is differently dimensioned (in transverse section) from the two elements requiring splicing. If a splice of this nature is to be effected, and bolts are to be used of approximately the same diameter as the width of the slots, it would be necessary to dispose the holes in the third element at a greater distance from the turn of the L-form than the corresponding holes in the elements being joined. Therefore, two lines of stock are required to solve this problem.

I have found that these difficulties may be overcome by the provision of lines of holes in an element of L-shaped cross-section, in which the holes of each line are alternately round holes and transversely elongated slots. If a pair of elements having holes of this nature are then aligned as described above, either to form a beam of double thickness or a substantially continuous L-beam, and the round holes of one element placed above the transversely elongated holes of the other element, bolts of a thickness comparable to the width of the holes may be passed through the aligned pairs of holes.

Therefore the elements of my invention lend themselves to direct splicing, where the elements being joined are nested over the length of the splice, or to nesting and coupling over their entire length to form a beam of double thickness where increased rigidity of a structure is required. Furthermore, a continuous beam may be formed by abutting two of my elements end to end, and employing as a splicing plate a short length of an element having the same transverse cross-section. Bolts having a diameter approximating the width of the holes may be used, so that only one line of stock need be carried.

My invention may generally be defined as a constructional element of L-shaped cross-section having at least one longitudinally extending line of regularly spaced holes in one flange and at least one longitudinally extending line of regularly spaced holes in the other flange, each of the said lines of holes consisting of alternate round and elongated holes, the elongated holes being elongated at substantially right angles to the longitudinal axis of the element. All the elongated holes are of equal size and all the round holes are of equal diameter.

I prefer to form the flanges of constant equal thickness and to employ elongated holes which are of a width equal to the diameter of the round holes, and a length equal to the diameter of the round holes plus an amount equal to the thickness of two flanges.

In the drawings:

Figure 1 is a perspective view of one embodiment of an element according to the invention;

Figure 2 is a perspective view showing two of the elements of Figure 1 joined at right angles to one another;

Figure 3 is a perspective view of two of the elements of Figure 1 abutted end to end and spliced with a splice plate cut from a length of another such element;

Figure 4 is a perspective view of two of the elements of Figure 1 directly spliced to one another to give a beam of substantially continuous L-shaped cross-section;

Figure 5 is a plan view of a gusset plate which may be employed to join two of the elements to one another at angles, and Figure 6 is a plan view showing two of the elements of Figure 1 joined by means of the gusset plate of Figure 5.

Referring to the drawings, reference character A indicates generally a constructional element of L-shaped cross-section made up of two flanges 10 and 11. Although it is by no means essential to the invention, I have shown flange 10 as being twice as wide as flange 11, and the two flanges as being of constant equal thickness.

Two lines of regularly spaced holes extend longitudinally of flange 10 and a single such line extends longitudinally of flange 11. Each of the three lines of holes consists of alternate round holes 12 and elongated holes 13. Elongated holes 13 are elongated at substantially right angles to the longitudinal axis of the element A.

Round holes 12 are of equal diameter and elongated holes 13 are of the same size. Holes 13 are of a width equal to the diameter of the holes 12, and are of a length equal to the diameter of the holes 12 plus an amount equal to the thickness of two flanges.

The holes of the three lines are transversely aligned and the elongated holes 13 in one line of an adjacent pair of lines are transversely aligned with the round holes 12 of the other line of the said pair of lines.

Two elements A may be aligned and bolted as shown in Figure 2 to form a right-angular joint; or they may be nested over a portion of their lengths, with the flanges 10 and 11 of one element abutting against the corresponding flanges of the other element (as shown in Figure 4) and the two elements A bolted to one another to form a direct splice, i. e. a splice which does not make use of a third member as a splicing plate. The bolting in each case is accomplished with conventional bolts 14 and nuts 15, and the bolts 14 are of approximately the same diameter as the diameter of round holes 12. Prior to bolting together, the two elements A must be so aligned that the round and elongated holes of one element, are directly above elongated and round holes respectively in the other element, at least in the case of all holes through which bolts are to be passed.

A further splicing arrangement is shown in Figure 3. Two of the elements A are abutted end to end to form a continuous L-beam, and a short length B, cut from an element A, is employed as splicing plate. Length B is of sufficient length to include four holes in each of its three lines of holes. Length B is aligned with the two elements A in such manner that its flanges 10 and 11 abut the flanges 10 and 11 respectively of the elements A, and that its round and elongated holes are aligned with elongated and round holes respectively in the elements A. Once again it will be noted that bolts 14 may be employed which are of approximately the same diameter as the round holes 12. The fact that bolts of this diameter may be employed can be attributed, in each case, to the fact that the holes 13 are of a length equal to the diameter of holes 12 plus an amount equal to the thickness of two flanges. Thus, even when the elements A are in nested relationship, and the centres of the holes in the elements are necessarily misaligned by an amount equal to the thickness of one flange, so long as the round holes 12 of one element are aligned with the elongated holes 13 of the other element, no portion of a round hole 12 in one of the elements will be covered over by a solid portion of the other element.

Figures 5 and 6 illustrate an arrangement for joining two elements A where angular intersection at any 15 degree interval between 0 and 90 degrees is desired. Reference character C indicates a gusset plate, which is a quadrant of a circular plate, and is provided with a plurality of round holes 16 of the same diameter as the round holes 12 in the elements A. A radial line containing at least three holes 16 occurs at each 15 degree interval between 0 and 90 degrees, the lines emanating from a hole adjacent the right-angular corner of the gusset plate.

The gusset plate C is placed upon one element A, with one of its straight-line edges parallel to the longitudinal axis of the element. The other element A is then placed over the gusset plate C and is aligned to intersect the lower element A at an angle of 15 degrees, or some multiple thereof between 15 and 90 degrees. The three units may then be bolted together to form a rigid joint.

I make no claim to the gusset plate C or to the use of this plate in combination with the elements of my invention. Figures 5 and 6 and the descriptive matter provided in connection with these two figures have been included merely to illustrate the versatility of my elements.

While I have not illustrated the case where an L-shaped beam of double-thickness is formed by nesting two elements over their entire lengths to give a beam of increased rigidity, it should be apparent from Figure 4 and the description thereof that when the elements of my invention are so nested, they may be bolted together with bolts of the same thickness as the diameter of the round holes.

While I have shown only elements having a single line of holes in one flange and two lines of holes in the other flange, I wish it to be understood that the number of lines per flange could be varied without departing from the scope of the invention, the only limitation in number being that there should be at least one line of holes in each flange. I also wish it to be understood that the two flanges constituting an element need not meet exactly at right angles.

What I claim as my invention is:

A constructional element of L-shaped cross-section, the two flanges constituting the L-shape being of the same gauge, the element having at least two lines of equally spaced holes extending longitudinally throughout the length of one flange and at least one line of equally spaced holes extending longitudinally throughout the length of the other flange; each of the lines of holes consisting of alternate round and elongated holes; the centers of all the holes in each of said lines lying in a straight line which is parallel to the longitudinal axis of the element; all of the round holes being of equal size; all of the elongated holes being elongated at right angles to the longitudinal axis of the element, and being of a width equal to the diameter of the round holes, and of a maximum length equal to the diameter of the round holes plus an amount equal to twice the thickness of one of the flanges; the holes of each of the said lines being transversely aligned; the transverse alignment of each adjacent pair of said lines positioning the elongated holes of one line of the pair opposite the round holes of the other line of the pair; the longitudinal spacing of adjacent holes in each line being equal to the transverse spacing of the lines of holes in the flange having at least two lines of holes therein; whereby when the element is placed in nesting relationship with a similar element with the round and elongated holes of one element aligned with the elongated and round holes respectively of the other element, a bolt of substantially the same diameter as said round holes may be passed through any of the thus aligned holes in the nested elements.

JAMES ALEXANDER MacKENZIE.

REFERENCES CITED

The following references are of record in the file of this patent:

UNITED STATES PATENTS

| Number | Name | Date |
|---|---|---|
| 1,763,300 | Gilbert | June 10, 1930 |
| 1,820,660 | Gilbert | Aug. 25, 1931 |